(12) United States Patent
Halmetschlager-Funek et al.

(10) Patent No.: US 12,101,557 B2
(45) Date of Patent: Sep. 24, 2024

(54) POSE TRACKING FOR ROLLING SHUTTER CAMERA

(71) Applicants: Georg Halmetschlager-Funek, Vienna (AT); Jeroen Hol, Hengelo (NL); Matthias Kalkgruber, Vienna (AT); Nikolaj Kuntner, Vienna (AT); Daniel Wolf, Modling (AT)

(72) Inventors: Georg Halmetschlager-Funek, Vienna (AT); Jeroen Hol, Hengelo (NL); Matthias Kalkgruber, Vienna (AT); Nikolaj Kuntner, Vienna (AT); Daniel Wolf, Modling (AT)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/375,813

(22) Filed: Oct. 2, 2023

(65) Prior Publication Data

US 2024/0031678 A1 Jan. 25, 2024

Related U.S. Application Data

(63) Continuation of application No. 17/135,055, filed on Dec. 28, 2020, now Pat. No. 11,792,517.

(Continued)

(51) Int. Cl.
*H04N 23/68* (2023.01)
*G06T 7/73* (2017.01)
*H04N 25/531* (2023.01)

(52) U.S. Cl.
CPC ............ *H04N 23/689* (2023.01); *G06T 7/73* (2017.01); *H04N 25/531* (2023.01); *G06T 2207/30244* (2013.01)

(58) Field of Classification Search
CPC .............. H04N 23/689; H04N 25/531; H04N 23/6811; H04N 23/6812; G06T 7/73;
(Continued)

(56) References Cited

U.S. PATENT DOCUMENTS 10,078,916 B2 9/2018 Elazary et al.
2003/0179294 A1 9/2003 Martins
(Continued)

OTHER PUBLICATIONS

Guo, Chao X., et al., "Efficient Visual-Inertial Navigation using a Rolling-Shutter Camera with Inaccurate Timestamps", Robotics: Science and Systems X, Jul. 12, 2014.
(Continued)

*Primary Examiner* — Usman A Khan
(74) *Attorney, Agent, or Firm* — CM Law; Stephen J. Weed

(57) ABSTRACT

A method and apparatus of tracking poses of a rolling-shutter camera in an augmented reality (AR) system is provided. The method and apparatus use camera information and inertial sensor readings from Inertial Measurement Unit (IMU) to estimate the pose of the camera at a reference line. Thereafter, relative pose changes at scanlines may be calculated using the inertial sensor data. The estimated reference pose of the camera is then further refined based on the visual information from the camera, the relative pose changes and the optimized reference line pose of a previous image. Thereafter, the estimate of the scanline poses may be updated using the relative pose changes obtained in the earlier steps.

20 Claims, 10 Drawing Sheets

Related U.S. Application Data

(60) Provisional application No. 63/085,775, filed on Sep. 30, 2020.

(58) Field of Classification Search
CPC . G06T 2207/30244; G06T 2207/10016; G06T 19/006
USPC ..................................................... 348/208.4
See application file for complete search history.

(56) References Cited

U.S. PATENT DOCUMENTS

| | | |
|---|---|---|
| 2005/0149231 A1* | 7/2005 | Pretlove ................ B25J 9/1671 700/264 |
| 2006/0202038 A1* | 9/2006 | Wang ................ G06K 7/10732 235/462.24 |
| 2007/0081695 A1* | 4/2007 | Foxlin ...................... G06T 7/73 382/103 |
| 2009/0303362 A1 | 12/2009 | Ebihara |
| 2012/0226468 A1 | 9/2012 | Dijkstra et al. |
| 2016/0035139 A1 | 2/2016 | Fuchs et al. |
| 2018/0046188 A1 | 2/2018 | Hwang et al. |
| 2018/0205963 A1 | 7/2018 | Matei et al. |
| 2019/0371024 A1 | 12/2019 | Babu et al. |
| 2021/0262800 A1 | 8/2021 | Levine et al. |

OTHER PUBLICATIONS

International Search Report and Written Opinion received in Patent Cooperation Treaty Application No. PCT/US2021/051462, dated Jan. 4, 2022, 13 pages.

Li, Mingyang, et al., "Real-Time Motion Tracking on a Cellphone Using Inertial Sensing and a Rolling-Shutter Camera", IEEE International Conference on Robotics and Automation (ICRA); Karlsruhe, Germany, May 6-10, 2013, pp. 4712-4719.

Li, Mingyang, et al., "Vision-Aided Inertia Navigation with Rolling-Shutter Cameras", International Journal of Robotics Research, vol. 33, No. 11, Sep. 1, 2014, pp. 1490-1507.

Ling, Yonggen, et al., "Modeling Varying Camera-IMU Time Offset in Optimization-Based Visual-Inertial Odometry", Advances in Databases and Information Systems; Oct. 5, 2018, pp. 491-507.

Patron-Perez, Alonso, et al., "A Spline-Based Trajectory Representation for Sensor Fusion and Rolling Shutter Cameras", International Journal of Computer Vision, vol. 113, No. 3, Feb. 27, 2015, pp. 208-219.

* cited by examiner

POSE TRACKING FOR ROLLING SHUTTER CAMERA

CROSS-REFERENCE TO RELATED APPLICATIONS

This application is a Continuation of U.S. application Ser. No. 17/135,055 filed on Dec. 28, 2020, and claims priority to U.S. Provisional Application Ser. No. 63/085,775 filed on Sep. 30, 2020, the contents of both of which are incorporated fully herein by reference.

TECHNICAL FIELD

This disclosure relates to augmented reality for computer vision. More specifically, this disclosure relates to providing an improved pose estimation of rolling shutter cameras for augmented reality.

BACKGROUND OF THE INVENTION

In recent years, computer vision ("CV") technology has been rapidly developing. An important application of CV technology is augmented reality ("AR"), which among other things provides interactive experiences for users in real-world settings with computer generated visual information. Users may wear AR glasses for enhanced experience in various AR applications. Typically, cameras, sensors, displays, and other components are integrated in such wearable AR glasses. Users explore the augmented world wearing the AR glasses. During users' movement, the camera may follow a trajectory, which can be seen as a sequence of poses of the camera. Accurate pose estimate is an important aspect for the AR system to provide good user experience.

BRIEF DESCRIPTION OF THE DRAWINGS

The above-mentioned advantages and other features of the disclosure will become more apparent to and the invention will be better understood by persons of ordinary skill of the art, with reference to the following description of the examples of the disclosure taken in conjunction with the accompanying drawings, wherein.

DETAILED DESCRIPTION

Figure 1A:
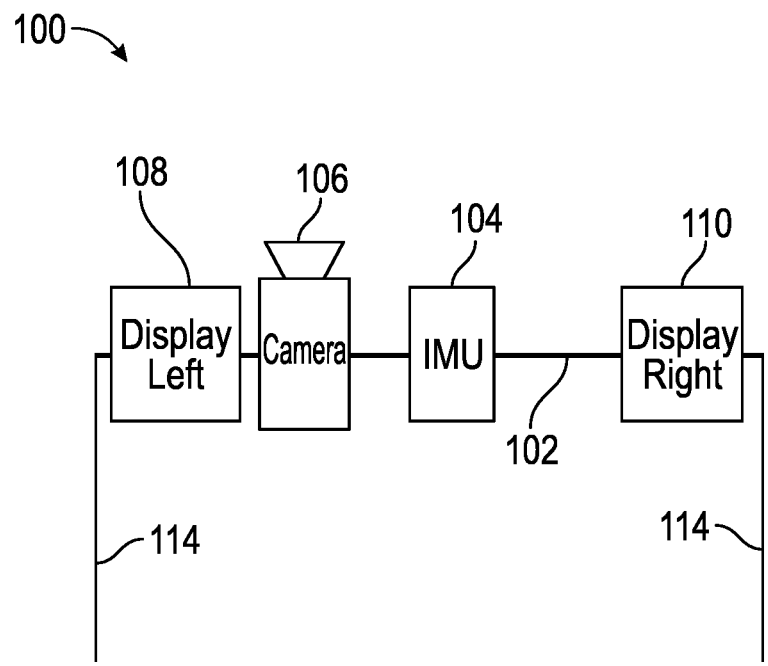
FIG. 1A illustrates a block diagram of an exemplary eyewear device that may use the visual-inertial tracking system (VITS) technology.

The disclosure provides examples that are an improvement over conventional camera pose tracking methods assuming the camera moves at constant velocity during the rolling shutter image readout time. In some examples, inertial sensor readings are used to estimate relative poses, i.e., the change(s) of the camera pose with regard to a reference pose, and efficiently update the camera pose for each line of scanning of an image captured by rolling shutter using the relative poses. This improves the accuracy of the estimate of the camera pose without significantly encumbering the computational resources of the AR system.

Several examples of the present disclosure are illustrated by the accompanying drawings and described in detail below. In the figures of the accompanying drawings, elements having the same reference numeral designations represent like elements throughout. The drawings are not to scale, unless otherwise noted. All terminologies and phraseology used herein are for the purpose of illustrating only and should not be understood as limiting. The phrases such as "including", "comprising", "having" and other variations thereof are meant to encompass the items as described and their equivalents without excluding any additional items thereof. Augmented Reality ("AR") systems generally refer to interactive computer environments and user experiences, wherein computer-generated sensory information is rendered in and/or combined with the real-world environment comprising real-world objects. Real-world imagery may be captured by one or more cameras of the AR system and blended, overlaid and/or otherwise combined with computer-generated graphics, texts and/or other types of virtual objects to provide a computer-enhanced user experience. The augmented reality may be provided in real time or near real time to create a live user experience. The blended environment of the real and virtual worlds aims at providing realistic and seamless overlay of objects from the two worlds. AR systems may provide users with AR experiences to a wide range of computer applications, such as gaming, teaching, healthcare, virtual touring, navigating and the like.

An AR system may provide a live experience to the user who moves about in a scene or near an area of interest. The AR system allows the user to explore the scene and view the enhanced imagery in a timely fashion. In order to provide a believable AR experience to the user, the AR system typically includes one or more image capture devices for recording video and includes a camera with suitable optics and interfaces, input/output hardware, communication means, and image processing programs.

Further, the AR system typically includes a tracking system performing tracking functions. The tracking system may observe trackable features in the captured images recorded by the camera and track them according to various algorithms. Accurate tracking is critical for the AR system to accurately render virtual imagery. If the tracking functions are not sufficiently accurate, the purported seamless overlay of the real and virtual worlds are likely lost. However, on many occasions, the image capture device such as a camera may not be sufficient as well as efficient to provide accurate renditions of the AR experience alone. For example, there might be noises captured or generated in processing the captured images. Or the image capture device may fail due to fast movement, blur or other real-world conditions the AR system may encounter. As such, additional data from other sensors, such as inertial sensors, may be helpful for accurate tracking.

Inertial sensors are widely used across the board for measuring local motions of the sensors. There are a number of types of inertial sensors measuring different aspects of local motion, such as accelerometers and gyroscopes that detect the acceleration and rotational changes of the inertial sensor. The tracking system of an AR system may take advantage of the inertial sensor data to supplement the tracking functions based on images captured by cameras. For example, Visual Inertial Tracking System ("VITS") technology has been developed to utilize the data provided by inertial sensors of the AR system for accurate and robust tracking.

A number of inertial sensors may be packaged, incorporated or integrated in one physical unit, the IMU (Inertial Measurement Unit). For example, an IMU may include several accelerators, gyroscopes and other sensors measuring the local motions on different axes of the space. There are many types of IMUs, such as Micro Electro Mechanical Sensors (MEMS) IMU, Fiber Optic Gyro (FOG) IMU, Ring Laser Gyro (RLG) and the like, which may be selected for different applications. The IMUs also come in different sizes. In particular, miniature IMUs are often selected for AR system applications. Such miniature IMUs may stand-alone, but more often are included and/or integrated with mobile devices of the AR system. For example, the IMU may be incorporated in an eyewear device of the AR system.

FIG. 1A illustrates a block diagram of an exemplary eyewear device of an AR system that may use the visual-inertial tracking system (VITS) technology. As illustrated in FIG. 1A, the eyewear device 100 may look like a pair of eyeglasses. Referring to the exemplary eyewear device 100 of FIG. 1A, it includes a front façade 102 and two arms 114. The eyewear device 100 may comprise any number of sensors and other components across its body. According to the example illustrated in FIG. 1A, an IMU 104 may be included on the front façade 102. An optical sensor, i.e., the camera 106, may be placed beside the IMU 104. Two displays, i.e. left display 108 and right display 110, are placed near the corners of the front facade 102 where the user's eyes are expected.

Persons skilled in the art understand that the eyewear device may comprise more optical sensors, inertial sensors, and/or other components that may be configured on the front façade 102, on the arms 114, or any other place of the eyewear device 100. The sensors and components may be configured to face the user, the scene, or any other directions. All of these configurations are contemplated and within the scope of the present disclosure.

Figure 1B:
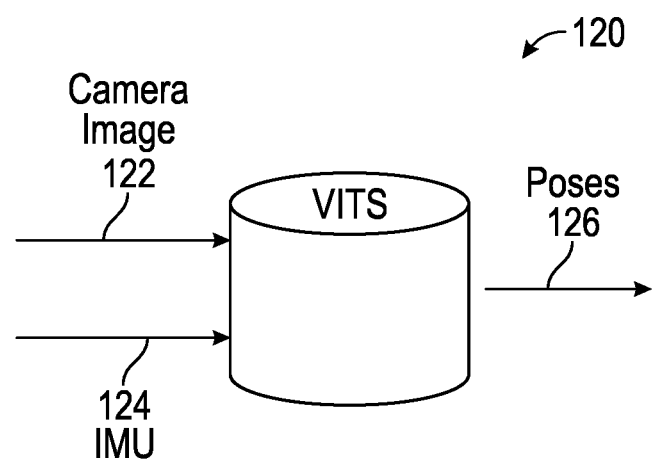
FIG. 1B illustrates a block diagram of an exemplary visual inertial tracking system (VITS)

FIG. 1B illustrates the visual inertial tracking system (VITS) that may be used in the exemplary eyewear device 100 of FIG. 1A. According to FIG. 1B, the VITS 120 takes camera image 122 that may be captured by camera 106 and the IMU sensor data 124 that may be provided by IMU 104 of FIG. 1A as inputs. The VITS 120 outputs the camera poses 126, which may be used by the tracking algorithms for tracking the eyewear device 100. Within the VITS 120, suitable algorithms may be used to compute the camera pose 126 based on the camera image 122 and the IMU data 124.

There are advantages to using IMU-based VITS technology in AR systems. For example, the IMUs of an AR system may be configured to measure very small changes in velocity as well as sampling/refreshing at a high frequency. More specifically, the IMU may have a sampling rate of eight hundred Hertz (800 Hz) or higher, which may be much higher than the video refresh rate, typically at thirty Hertz (30 Hz) of standard videos. As such, the IMU has ample data rate for supplementing the visual data of the tracking system.

Figure 2:
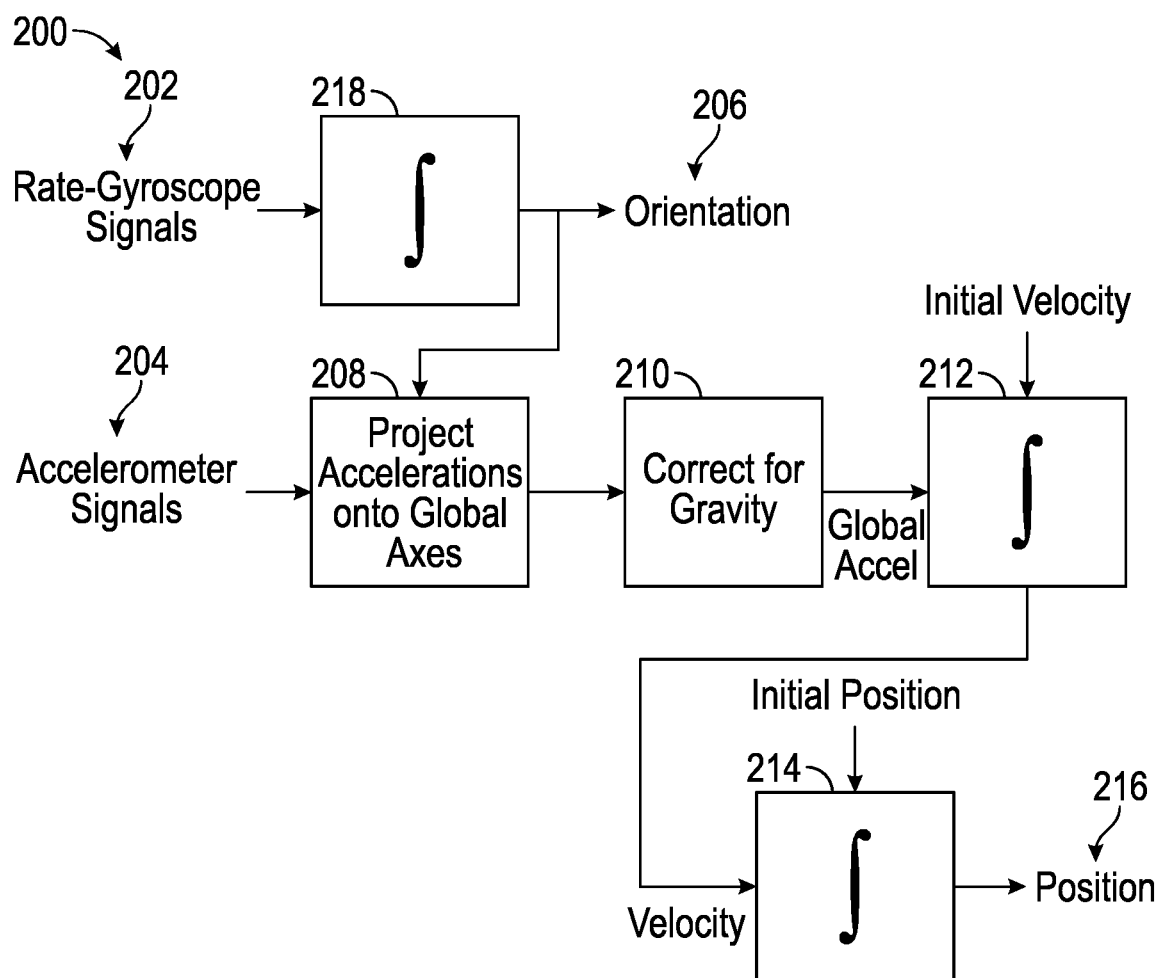
FIG. 2 illustrates a block diagram of an exemplary processing pipeline for inertial sensor measurements.

FIG. 2 is a block diagram of an exemplary processing pipeline for inertial sensor measurements that may be adopted in the VITS technology. According to the example of FIG. 2, the inertial sensor measurement pipeline 200 comprises at least one gyroscope sensor providing rate-gyroscope signals 202 to an integration module 218. The integration module 218 computes the orientation of the IMU based on the gyroscopic data. The inertial sensor measurement pipeline 200 further comprises at least one accelerometer providing acceleration data 204 to module 208. Module 208 takes the acceleration data 204 and the orientation 206 computed from the rate-gyroscope signals 202 as inputs. Module 208 then projects the overall acceleration of the IMU onto global axes to compute the global acceleration of the IMU.

In the next step, module 210 will further correct errors in the computation result of module 208 caused by gravity. As a result, module 210 outputs gravity corrected reading of global acceleration of the IMU. In the next module 212, the initial velocity of the IMU and the global acceleration reading are used to compute the current velocity of the IMU. The initial velocity information may be provided by other components of the AR system. For example, the initial velocity of the IMU may be derived from an estimation process, or otherwise computed, measured and/or recorded by the AR system. Next, in module 214, the current velocity and the initial position information of the IMU are used to compute the position 216. Similarly, the initial position data may be derived from an estimation process, or otherwise computed, measured and/or recorded by the AR system. After processing of the sensor data and the initial data as described above, the orientation 206 and position 216 of the IMU may be derived and used by the VITS technology for tracking.

In the illustration of FIG. 2, the exemplary IMU comprises at least one accelerometer and at least one gyroscope sensor. It indicates that the IMU may compute its position and orientation without the need to resort to data from other sensors, such as the camera. Persons skilled in the art understand that there may be other sensors configured in the IMU that may further assist in the computation of the orientation and position of the IMU. All such configurations are contemplated and within the scope of the present disclosure.

Figure 3:
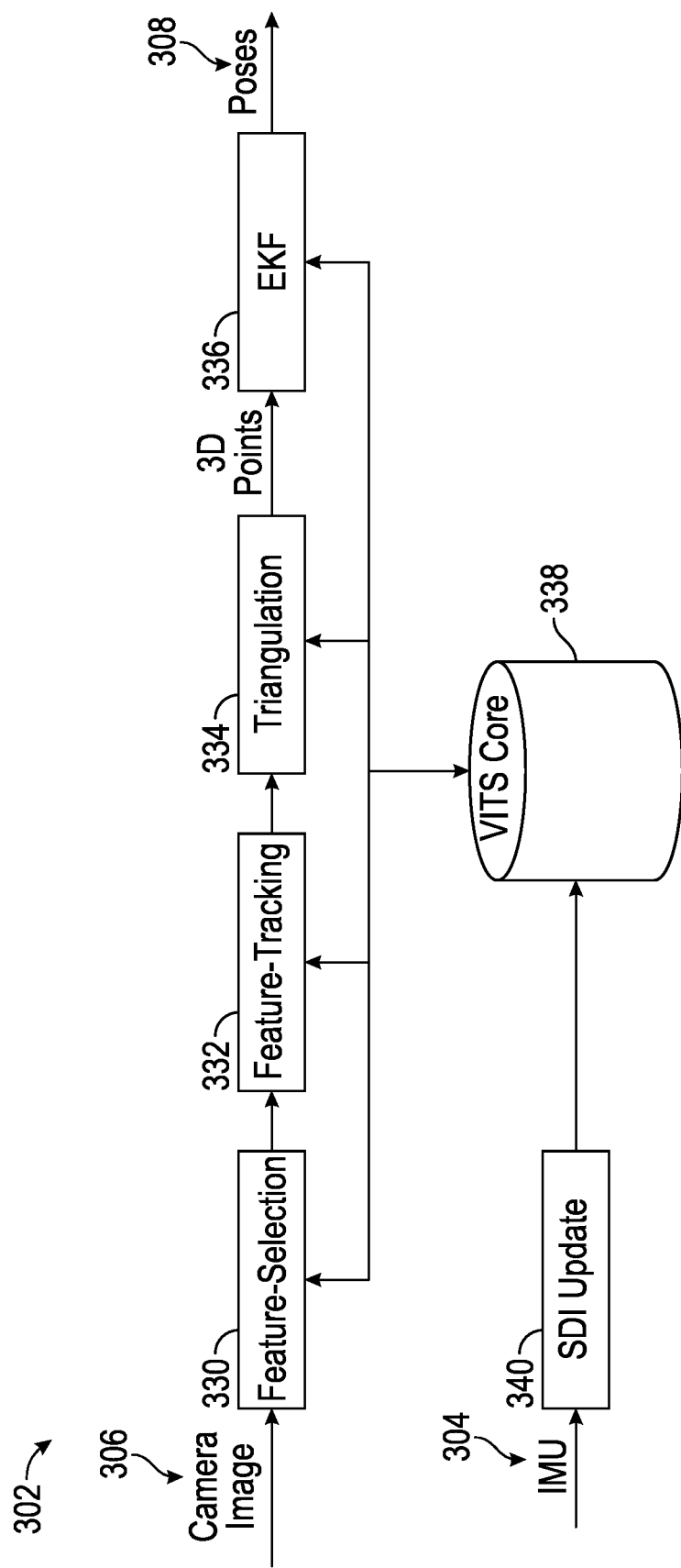
FIG. 3 illustrates an exemplary EKF tracking method that may be part of the visual inertial tracking system (VITS)

The VITS technology described in connection with FIG. 1B may be configured to work with a number of estimation algorithms to compute the poses of the eyewear devices. FIG. 3 illustrates an exemplary VITS using an Extended Kalman filter (EKF). As explained in FIG. 1B and reiterated here with FIG. 3, VITS 120 takes camera image 122 and IMU data 124 as inputs. As illustrated in more detail in FIG. 3, the camera image 122 may go through a number of steps contained in the upper pipeline of the VITS 120. Meanwhile, the IMU data 124 may go through a lower pipeline of FIG. 3 comprising a well-known Strap Down Integration (SDI) update at 340 before being fed into the VITS core 338, which holds the tracking information.

More specifically, the upper pipeline for processing the camera image 122 may comprise a feature-selection module 330, a feature-tracking module 332, a triangulation module 334 and EKF module 336. At the feature selection module 330, good trackable features in the images may be selected for tracking. For example, corners, edges, and other easy-to-find features are good candidates as trackable features. After the feature selection, those selected features are tracked from frame to frame in the image sequence at the feature tracking module 332. The spatial location of the tracked features may be computed in the triangulation module 334 to get their three-dimensional (3D) locations. Finally, the 3D information of the tracked features may be processed in an EKF module, which will calculate the poses of the eyewear device. During this process, the VITS core 338 may communicate, control and/or interact with each step of the upper pipeline in the tracking process. EKF is a well-known method for estimating camera poses and parameters using camera and IMU data. One of the assumptions the EKF method depends on is that the IMU and image captures are physically tightly coupled, which makes the EKF method especially suitable for AR applications using eyewear devices.

As described above, the VITS is a visual-inertial tracking system, wherein both the visual data and inertial data are used to track the poses of the camera. For the VITS tracking to work, the IMU and the camera shall be arranged in such a way that the IMU's readings may be used to measure the camera's movement. The eyewear device 100 illustrated in FIG. 1A is one such example where the IMU and camera are tightly coupled to the eyewear device, such that the IMU and the camera are basically moving in the same manner. Once the above condition is met, the VITS may track the poses of the camera as follows:

For frames of video sequence that are captured at certain frequency, such as thirty Hertz (30 Hz), the VITS may refine the camera's pose at the time each successive frame is taken using the visual information. When the camera is between two frames, the VITS may estimate the poses of the camera by reading the IMU data. This VITS method is made possible because of the frequency disparity between the relatively low frequency (e.g., 30 Hz) for image capturing and the high frequency (e.g., 800 Hz) of the IMU. The high frequency of the IMU provides abundant data for the VITS to closely estimate/predict the camera's poses between frames.

With good quality camera and IMU sensors, the VITS tracking system may predict where a 3D point in the previous frame may be observed in the next frame with sub-pixel accuracy. The prediction may use the camera pose of the first frame and the IMU measurements between the first and the second frame to predict the location of the tracked features. The camera pose predictions are critical for the AR system. For example, they help to speed up the search for the tracked points in the new frames.

The predictions thus made in the VITS may not be perfect due to many reasons. For example, the IMU samples may have noise or are otherwise inaccurate. To improve the accuracy of the predictions, updating steps may be introduced in the tracking method. For example, updating steps may make use of the difference between the predictions and the actual observations to come up with a refined pose for the new image. And the refined pose may be used to further update the next image as well. As such, all predicted camera poses may be updated in turn.

In many AR applications, it may be preferred that the components of the eyewear device be light, small, and inexpensive. For visual sensors, such as the cameras, the inexpensive complementary metal oxide semiconductor (CMOS) cameras are becoming increasingly popular. Compared to other types of image sensors, such as the charge coupled device (CCD) sensors, the CMOS image sensors have faster readout speed, higher sensitivity and lower power consumption. For digital cameras, there are two different shutter modes—the global shutter mode and rolling shutter mode. Although CMOS cameras may be configured to operate in both global shutter mode and rolling shutter mode, the rolling shutter mode cameras are less expensive and are often used in consumer products.

With global-shutter mode, a digital camera captures the image of an entire scene at the same time. The image thus taken may be played back for viewing, analyzing, tracking and/or other purposes without further processing. The rolling-shutter camera, however, captures images by exposing different lines of the scene at different times. More specifically, a rolling shutter camera captures the image of a scene by scanning across the scene sequentially. The scanning may be rapidly performed line-by-line. As such, each line in the image is taken at a slightly different time. The rolling shutter effect may cause the image to wobble or skew if it was taken when the camera was moving or vibrating during readout time, the time when the image is being scanned. It may also cause spatial and temporal aliasing if when the image was taken, the camera was moving too fast or the camera flash did not light the rows of pixels evenly. Therefore, if the image is reconstructed by putting the lines together without taking into account the different scanning time of the lines, the reconstructed image may be distorted. In AR applications, such distortion may cause the tracking to fail.

To address the rolling-shutter effect, it is necessary to understand more details regarding how rolling-shutters work. An image taken by a digital camera typically comprises a number of lines. For rolling-shutter images, one line of the image, such as the line that starts a new image, may be designated as a reference line. Other lines of the image may be referred to as scanlines. For rolling-shutter images, the reference line may be considered as the first line that is scanned. The scanlines are scanned one-by-one after the reference line. The duration to scan the entire image is the time from scanning the reference line to the last of the scanlines and can also be referred to as readout time. The scan of a rolling-shutter camera may be done very rapidly, and the scan time may be very short. For example, the time to scan one line may be as little as 50 µs. However, given the total number of lines of an image, the time needed to scan from the reference line, i.e., the first line scanned, to the last of the scanlines may be in the magnitude of In an AR system using rolling-shutter cameras where the user may move at unknown time and speed, tracking may be challenging or failed if the rolling-shutter effect is not properly taken into account.

In the VITS tracking described earlier, the tracking methods assume that the images were captured using global shutter cameras. When the VITS uses rolling shutter cameras, the system will become more complex. There are some prior art proposals to address VITS tracking with rolling-shutter cameras. For one example, a constant velocity model offers a method to address the rolling-shutter effect. The constant velocity model assumes that the camera moves at a constant velocity during the readout time. According to this model, the tracking system may compute the velocity of the camera at the time when the next camera pose should be refined.

More specifically, the constant velocity model for rolling shutter cameras may start by selecting a reference line of the image. As illustrated above, the reference line may be the first line of the image or any other line of the image. The constant velocity model then assumes that the position change of the camera between successive image lines during the readout time remains unchanged or constant. The position of the camera for each successive line may be derived by adding a uniform position change of the camera relative to the reference line. In the present disclosure, such a process may be envisioned as successively adding a fixed distance, or a relative pose, to the position of the camera at the reference line to compute the position of the camera at each scanline. The relative pose in the constant velocity model is a fixed distance that does not change over the readout time of each frame. Various methods may be provided to compute the relative pose of the constant velocity model. For example, the relative pose may be computed by multiplying the scan time of a line and the velocity obtained at the time of refinement.

Figure 4:
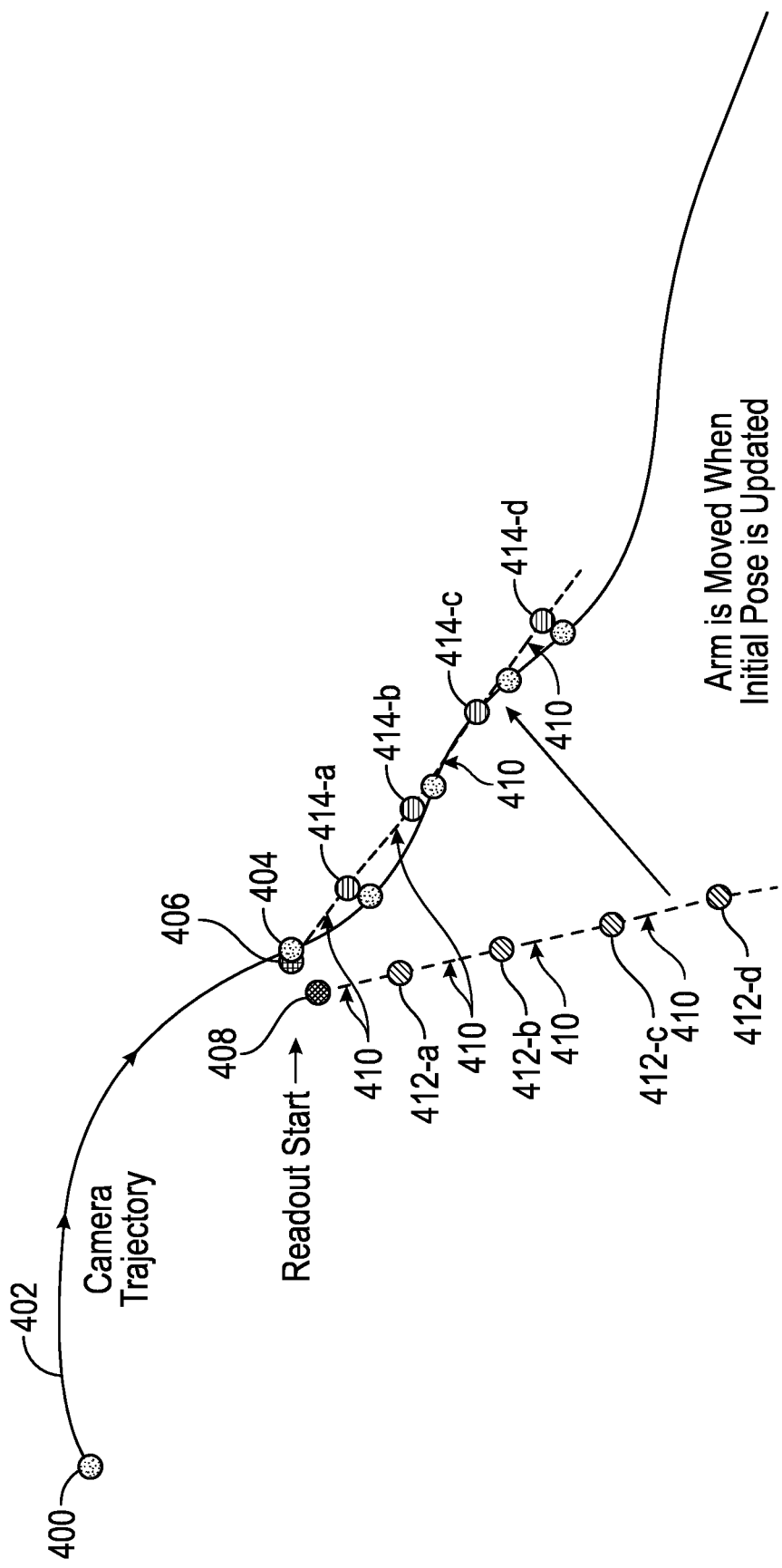
FIG. 4 illustrates a constant velocity tracking method according to the prior art.

FIG. 4 illustrates an example of camera pose tracking based on the constant velocity model of a rolling-shutter camera. Referring to FIG. 4, a camera moves along a trajectory 402 from top left to bottom right, as indicated by the arrows illustrated therein. The trajectory 402 represents a random trajectory in a two-dimensional plane. It is understood by persons skilled in the art that a three-dimensional trajectory may be used or conceptually constructed based on the two-dimensional example. For example, it can be envisioned that the camera may be simultaneously moving in a third axis orthogonal to the two-dimensional plane illustrated in FIG. 4.

In the example illustrated in FIG. 4, a previous readout time for frame P1 started at 400. According to the example, the camera's pose at 400 has been previously refined. The refinement of the camera pose at 400 may be accomplished using any optimization algorithms, methods, information, data and so on, including the constant velocity model itself that will be described in more detail below.

As the camera continuously moves on the trajectory 402, the readout time for the next frame P2 starts when the camera moves to the point of 404. The tracking system will first estimate the position of the camera at the time it moves to 404. According to the constant velocity model, the tracking system may use the known refined camera pose at 400 to compute a first pose estimate 408. As illustrated in FIG. 4, the first estimated pose 408 is quite off from the camera's real-world position 404.

At the same time, the AR system also estimates an initial velocity of the camera when it reaches the real-world position 404, which will be used to calculate the relative poses for frame P2. For simplicity and conciseness, the first line of frame P2 is designated as the reference line which is scanned when the readout time starts and which is the same time when the camera reaches 404. Thereafter, the camera pose for each of the scanlines may be calculated by adding a fixed relative pose successively to the first pose estimate 408.

More specifically, after the first pose estimate 408 is made, the relative poses 410 may be calculated. One of the key assumptions of the constant velocity model is that the camera moves in a constant velocity during the readout time for the purpose of camera pose estimation. Therefore, the constant velocity model assumes that the camera pose change between any two scanlines and between the first scanline and the reference line does not change. As such, the constant velocity model may only estimate the relative pose 410 once and apply it to all the lines of the image. As illustrated in FIG. 4, the constant relative pose 410 may be used to estimate the camera pose of the first scanline 412-a after the readout starts by adding the relative pose 410 to the first estimate pose 408 of the reference line. Similarly, each of the scanlines after 412-a, namely 412-b, 412-c, and 412-d, may be successively estimated by adding the relative pose 410 to the previous estimate. This process may be repeated throughout the rest of the scanlines of P2 not shown in FIG. 4. As a result, a series of camera poses for each of the scanlines of P2 may be obtained. The camera poses for all lines obtained in this way are denoted as 412-X hereinafter.

Thereafter, the constant velocity model may refine the first estimated camera pose 408. The constant velocity model may use data accumulated and/or calculated with respect to the previous image P1, such as the refined camera pose data at 400 when the last readout time started. The constant velocity model may also use the visual information from the camera image in conjunction with the pose estimates of 412-X to update and refine the first pose estimate 408. As a result, the first estimated pose 408 is updated to the refined pose of 406. Thereafter the constant velocity model will update the camera poses 412-X based on the refined pose 406 and lever arm 410. For example, as illustrated in FIG. 4, the constant velocity model may update the camera poses 412-a, 412-b, 412-c, and 412-d by adding the pose change 410 consecutively from the refined pose 406 to arrive at the updated camera poses 414-a, 414-b, 414-c, and 414-d. Similarly, all the rest of the updated poses of P2 not illustrated in FIG. 4, collectively denoted as 414-X, may be calculated as such.

As illustrated in FIG. 4, the refined camera poses 414-X are not far off from the camera pose on the real trajectory 402 for the same line of exposure. It can be seen from the example of FIG. 4, however, that the refined camera poses 414-X for each scanline are still not quite close to the real-world poses represented by the successive 404s on the trajectory 402. Persons skilled in the art may understand that one of the reasons for the inaccuracy of the constant velocity model is the assumption that the camera moves at a constant velocity. In addition, any inaccuracies may add up after several hundreds or thousands of repetitions depending on the number of lines of the image.

As described above, the common trajectories for the camera in AR applications may be mostly unpredictable and cannot be accurately modeled using constant velocity. For example, to explore the augmented world in an interactive way, turning and moving in nonlinear faction may be common. Further, as the camera may typically be light and worn by the user, sudden accelerations in rotation and speed may also be common, which causes the camera trajectory to change during the readout time. This may contradict and invalidate the assumption of the constant velocity model that the camera travels at constant speed during the readout time. As illustrated in the example in FIG. 4, although the constant velocity model's estimates of 414-X may not be too far off from the real trajectory of the camera, the discrepancy is noticeable, which may affect user experience.

The present disclosure provides an improvement to the constant velocity model for estimating the camera pose of rolling shutter cameras. According to an example of the present disclosure, instead of assuming that the camera moves at a constant velocity during the entire readout time, the improvement of the present disclosure will model velocity changes of the camera during the readout time. For example, between refinements of camera poses for successive frames, the present disclosure may use the accumulated IMU data to estimate the camera pose of each scanline.

Figure 5:
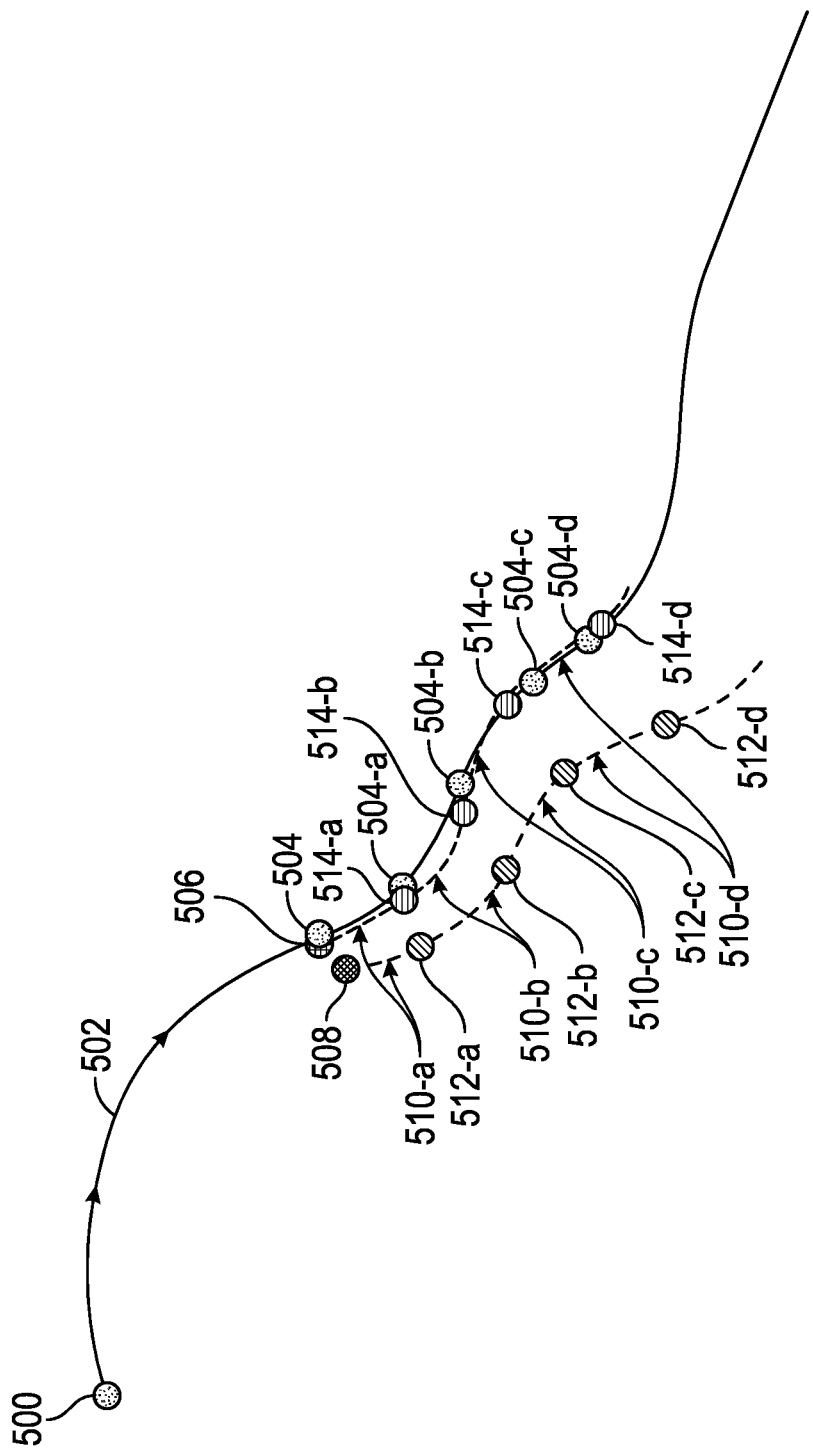
FIG. 5 illustrates a tracking method according to an example of the present disclosure.

FIG. 5 illustrates an example of the camera pose tracking based on the present disclosure. Referring to FIG. 5, the camera moves along a camera trajectory 502 in the direction indicated by the arrows on the trajectory from top left to bottom right, which is substantially the same trajectory 402 illustrated in FIG. 4. Other aspects of the example illustrated in FIG. 5 regarding the movement of the camera on the trajectory may also be substantially similar to the example illustrated in FIG. 4. Therefore, the examples shown in FIGS. 4 and 5 may be understood as comparing the different algorithms of present disclosure to the constant velocity model for the same example. As such, although the camera trajectory of FIG. 5 is depicted in a two-dimensional plane, the camera may also be moving in a third dimension as described with respect to FIG. 4. The camera of FIG. 5 may also be part of an eyewear device worn by a user moving in the direction of the trajectory during an AR application. As such, persons skilled in the art understand that some of the descriptions made in connection with the example in FIG. 4 may be substantially the same with respect to the example in FIG. 5. For simplicity and conciseness, all similar descriptions made in connection with FIG. 4 are incorporated herein with respect to FIG. 5, unless it is clear from the description, illustration, context or common sense that differences or contrasts are intended or present.

Referring to FIG. 5, the camera was at the point of 500 on the camera trajectory when the readout time of frame P1 started. According to the example of the present disclosure, the camera's pose for P1 was also refined at 500 when the readout time of the P1 began. As the camera continues to travel on the trajectory from P1, a new image or frame P2 starts. According to one example, the tracking system, or tracker, may synchronize or otherwise determine when the new readout time of P2 has begun. In this example, the readout time of P2 starts when the camera travels to the real-world point of 504, where the tracking system makes its estimate of the pose of the camera.

The first estimated pose of P2 is illustrated in FIG. 5 at 508. As shown in FIG. 5, the first pose estimate 508 may have a significant offset from the real-world camera pose 504. As described later, the first pose estimate 508 may also serve as a baseline estimate for the subsequent calculation and refinement. Therefore, the first pose estimate 508 may also interchangeably refer to as the reference line post estimate hereinafter.

Thereafter, based on the first estimate 508, the tracking system will calculate the relative poses for the scanlines using the inertial sensor information. Referring to FIG. 5, the calculated pose changes for each of the first four scanlines relative to the first estimated pose of P2 are exemplarily illustrated as the 510-*a*, 510-*b*, 510-*c* and 510-*d*. For simplicity and conciseness, only four relative scanline pose changes are illustrated in FIG. 5. Persons skilled in the art understand that subsequent poses changes may be similarly illustrated for each scanline of the image P2 and all the relative pose changes may be collectively referred to as 510-X in the disclosure. In an example of the present disclosure, the relative pose change for each scanline may be directly based on the first estimate 508. In the example illustrated in FIG. 5, the relative pose change for the first scanline is represented by 510-*a*; the relative pose change for the second scanline may be represented by 510-*a* and 510-*b* concatenated; the relative pose change for the third scanline may be represented by 510-*a*, 510-*b* and 510-*c* concatenated; and the relative pose change for the fourth scanline may be represented by 510-*a*, 510-*b*, 510-*c* and 510-*d* concatenated together. The rest of the relative pose changes of each scanline of P2 may be similarly calculated. Persons skilled in the art understand that the relative poses may be represented by vectors of several dimensions/axes, and the concatenation of the relative pose changes described above may be calculated by adding the respective numbers on the same dimension/axis of the relative poses.

With the relative pose change, the tracking system may calculate the estimated pose for each scanline. Referring to FIG. 5, the first scanline pose 512-*a* may be calculated by adding the relative pose change 510*a* to the reference line 508. The second scanline pose 512-*b* may be calculated by adding the relative pose change 510*a* and 510*b* to the reference line 508. Similarly, the third scanline pose 512-*c* and the fourth scanline pose 512-*d* may be calculated by adding the third and the fourth relative pose changes as described above. The rest of the scanlines of P2 may be similarly calculated and all the scanlines of P2 may be collectively referred to as 512-X in the disclosure.

As such, the tracking system may calculate a first estimate of a camera trajectory as illustrated by the lower curve from the reference line estimate 508 over the scanline pose estimates 512-*a*, 512-*b*, 512-*c*, 512-*d*, and the rest of the scanline pose estimates of P2 that are not shown in FIG. 5. It can be observed from FIG. 5 that although the first estimated trajectory may resemble the trajectory 502 better than the constant velocity model as illustrated in FIGS. 3-4, the spatial offset may still be significant for the purpose of AR applications.

According to an example of the present disclosure, the tracking system will further refine the reference line pose 508 by using the camera image information in conjunction with the scanline poses 512-X of P2 and scanlines poses of previous images, such as P1 and images earlier than P1 if they exist. As a result of the refinement, a refined reference line 506 may be calculated as illustrated in FIG. 5. As shown in FIG. 5, the refined reference line 506 is very close to the camera's real pose 504 and much closer than the first estimated reference line 508. With the refined reference line 506, the tracking system may use the previously calculated relative pose changes 510-X on the refined reference line 506 to arrive at the final estimated camera poses 514-X (namely 514-*a*, 514-*b*, 514-*c*, 514-*d* as illustrated in FIG. 5 and the rest of the final estimated camera poses of P2). In this example of the present disclosure, the 510-X may be considered as or likened to lever arms because after the refinement of 508, the previously calculated 510-X are directly used to update the final estimated camera poses 514-X from 506 without any change. For example, if the camera pose change is captured in a six-dimensional (6D) space, such as having 3 orientation readings around the x-, y- and z-axes and 3 translation readings along these axes, the updating of the final estimated camera poses of P2 may be seen as simply transposing 510-X with an updated reference line.

Figure 6:
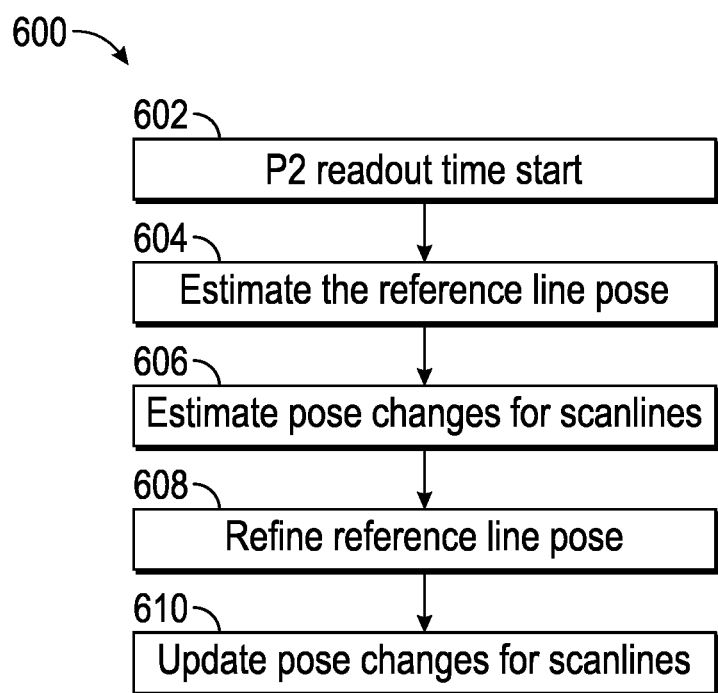
FIG. 6 is a block diagram of the tracking method according to the example of the present disclosure.

FIG. 6 is a block diagram of an example rolling-shutter camera VITS. According to the example of the present disclosure 600 illustrated in FIG. 6, a readout time for the current image or frame P2 starts at step 602. The reference line pose 508 is estimated in step 604 in the manner described in connection with FIG. 5. Based on the estimate of the reference line pose and the inertial sensor data, the tracking system will estimate the pose changes for each scanline in 606. In 608, the tracking system will then incorporate the visual information from the camera image and refine the reference line pose 508 into 506. Thereafter, in 610, the relative camera poses of the scanlines for the entire image P2 may be updated based on the refined reference pose. It is understood that the method described in FIG. 6 is only one example of the present disclosure. Alternative methods that may have additional steps, combined steps, or have some or all of the steps executed in different order and/or simultaneously are all within the scope and spirit of the present disclosure.

Figure 7:
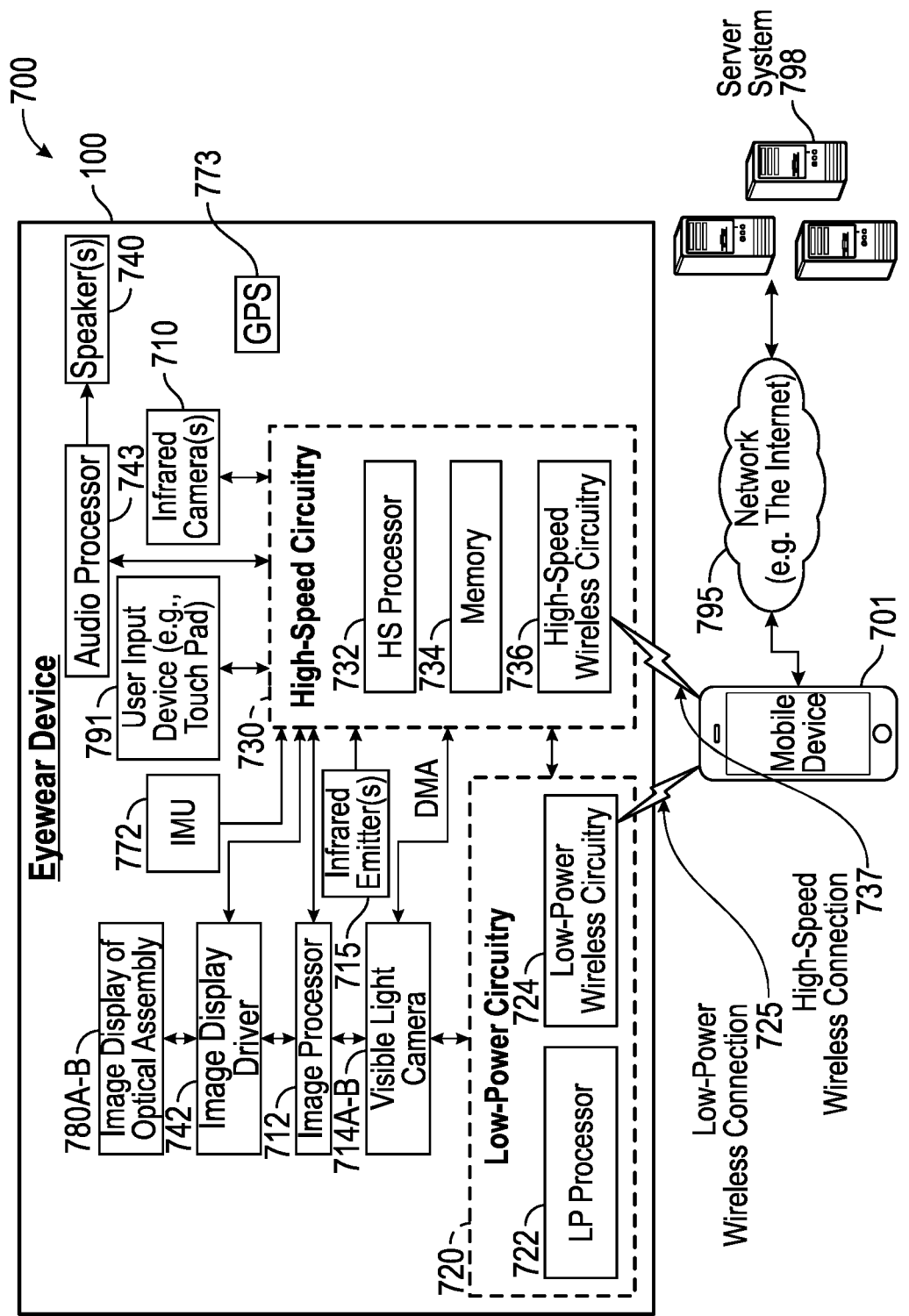
FIG. 7 illustrates a functional block diagram of an example system including a wearable device and a server system connected via various networks.

FIG. 7 is a functional block diagram of an example system 700 that includes a wearable device (e.g., the eyewear device 100), a mobile device 701, and a server system 798 connected via various networks 795 such as the Internet. The system 700 includes a low-power wireless connection 725 and a high-speed wireless connection 737 between the eyewear device 100 and the mobile device 701.

As shown in FIG. 7, the eyewear device 100 includes one or more visible-light cameras 714A, 714B that capture still images, video images, or both still and video images, as described herein. The cameras 714A, 714B may have a direct memory access (DMA) to high-speed circuitry 730 and function as a stereo camera. The cameras 714A, 714B may be used to capture initial-depth images that may be rendered into three-dimensional (3D) models that are texture-mapped images of a red, green, and blue (RGB) imaged scene. The device 100 may also include a depth sensor, which uses infrared signals to estimate the position of objects relative to the device 100. The depth sensor in some examples includes one or more infrared emitter(s) 715 and infrared camera(s) 710.

The eyewear device 100 further includes two image displays of each optical assembly 780A, 780B (one associated with a left side and one associated with a right side). The eyewear device 100 also includes an image display driver 742, an image processor 712, low-power circuitry 720, and high-speed circuitry 730. The image displays of each optical assembly 780A, 780B are for presenting images, including still images, video images, or still and video images. The image display driver 742 is coupled to the image displays of each optical assembly 780A, 780B in order to control the display of images.

The eyewear device 100 additionally includes one or more speakers 740 (e.g., one associated with the left side of the eyewear device and another associated with the right side of the eyewear device). The speakers 740 may be incorporated into the frame, temples, or corners of the eyewear device 100. The one or more speakers 740 are driven by audio processor 743 under control of low-power circuitry 720, high-speed circuitry 730, or both. The speakers 740 are for presenting audio signals. The audio processor 743 is coupled to the speakers 740 in order to control the presentation of sound.

The components shown in FIG. 7 for the eyewear device 100 are located on one or more circuit boards, for example a printed circuit board (PCB) or flexible printed circuit (FPC), located in the rims or temples. Alternatively, or additionally, the depicted components can be located in the corners, frames, hinges, or bridge of the eyewear device 100. Left and right visible-light cameras 714A, 714B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 7, high-speed circuitry 730 includes a high-speed processor 732, a memory 734, and high-speed wireless circuitry 736. In the example, the image display driver 742 is coupled to the high-speed circuitry 730 and operated by the high-speed processor 732 in order to drive the left and right image displays of each optical assembly 780A, 780B. High-speed processor 732 may be any processor capable of managing high-speed communications and operation of any general computing system needed for eyewear device 100. High-speed processor 732 includes processing resources needed for managing high-speed data transfers on high-speed wireless connection 737 to a wireless local area network (WLAN) using high-speed wireless circuitry 736.

In some examples, the high-speed processor 732 executes an operating system such as a LINUX operating system or other such operating system of the eyewear device 100 and the operating system is stored in memory 734 for execution. In addition to any other responsibilities, the high-speed processor 732 executes a software architecture for the eyewear device 100 that is used to manage data transfers with high-speed wireless circuitry 736. In some examples, high-speed wireless circuitry 736 is configured to implement Institute of Electrical and Electronic Engineers (IEEE) 802.11 communication standards, also referred to herein as Wi-Fi. In other examples, other high-speed communications standards may be implemented by high-speed wireless circuitry 736.

The low-power circuitry 720 includes a low-power processor 722 and low-power wireless circuitry 724. The low-power wireless circuitry 724 and the high-speed wireless circuitry 736 of the eyewear device 100 can include short-range transceivers (Bluetooth™ or Bluetooth Low-Energy (BLE)) and wireless wide, local, or wide-area network transceivers (e.g., cellular or Wi-Fi). Mobile device 701, including the transceivers communicating via the low-power wireless connection 725 and the high-speed wireless connection 737, may be implemented using details of the architecture of the eyewear device 100, as can other elements of the network 795.

Memory 734 includes any storage device capable of storing various data and applications, including, among other things, camera data generated by the left and right visible-light cameras 714A, 714B, the infrared camera(s) 710, the image processor 712, and images generated for display by the image display driver 742 on the image display of each optical assembly 780A, 780B. Although the memory 734 is shown as integrated with high-speed circuitry 730, the memory 734 in other examples may be an independent, standalone element of the eyewear device 100. In certain such examples, electrical routing lines may provide a connection through a chip that includes the high-speed processor 732 from the image processor 712 or low-power processor 722 to the memory 734. In other examples, the high-speed processor 732 may manage addressing of memory 734 such that the low-power processor 722 will boot the high-speed processor 732 any time that a read or write operation involving memory 734 is needed.

As shown in FIG. 7, the high-speed processor 732 of the eyewear device 100 can be coupled to the camera system (visible-light cameras 714A, 714B), the image display driver 742, the user input device 791, and the memory 734.

The server system 798 may be one or more computing devices as part of a service or network computing system, for example, that include a processor, a memory, and network communication interface to communicate over the network 795 with an eyewear device 100 and a mobile device 701.

The output components of the eyewear device 100 include visual elements, such as the left and right image displays associated with each lens or optical assembly 780A, 780B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker, or a vibrating actuator), or an outward-facing signal (e.g., an LED, a loudspeaker). The image displays of each optical assembly 780A, 780B are driven by the image display driver 742. In some example configurations, the output components of the eyewear device 100 further include additional indicators such as audible elements (e.g., loudspeakers), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, a one or more speakers positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location, force or location and force of touches or touch gestures, or other tactile-configured elements), and audio input components (e.g., a microphone), and the like. The mobile device 701 and the server system 798 may include alphanumeric, pointer-based, tactile, audio, and other input components.

In some examples, the eyewear device 100 includes a collection of motion-sensing components referred to as an inertial measurement unit 772. The motion-sensing components may be micro-electro-mechanical systems (MEMS) with microscopic moving parts, often small enough to be part of a microchip. The inertial measurement unit (IMU) 772 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS unit 773, one or more transceivers to generate relative position coordinates, altitude sensors or barometers, and other orientation sensors. Such positioning system coordinates can also be received over the wireless connections 725, 737 from the mobile device 701 via the low-power wireless circuitry 724 or the high-speed wireless circuitry 736.

The IMU 772 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the orientation of the device 100 in spherical coordinates. The programming for computing these useful values may be stored in memory 734 and executed by the high-speed processor 732 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure bio signals (e.g., blood pressure, heart rate, body temperature, perspiration, or brain waves), or to identify a person (e.g., identification based on voice, retina, facial characteristics, fingerprints, or electrical bio signals such as electroencephalogram data), and the like.

The mobile device 701 may be a smartphone, tablet, laptop computer, access point, or any other such device capable of connecting with eyewear device 100 using both a low-power wireless connection 725 and a high-speed wireless connection 737. Mobile device 701 is connected to server system 798 and network 795. The network 795 may include any combination of wired and wireless connections.

The system 700, as shown in FIG. 7, includes a computing device, such as mobile device 701, coupled to an eyewear device 100 over a network. The system 700 includes a memory for storing instructions and a processor for executing the instructions. Execution of the instructions of the system 700 by the processor 732 configures the eyewear device 100 to cooperate with the mobile device 701. The system 700 may utilize the memory 734 of the eyewear device 100 or the memory elements of the mobile device 701. Also, the system 700 may utilize the processor elements 732, 722 of the eyewear device 100 or the central processing unit (CPU) of the mobile device 701 (FIG. 5). In addition, the system 700 may further utilize the memory and processor elements of the server system 798. In this aspect, the memory and processing functions of the system 700 can be shared or distributed across the eyewear device 100, the mobile device 701, and the server system 798.

Figure 8:
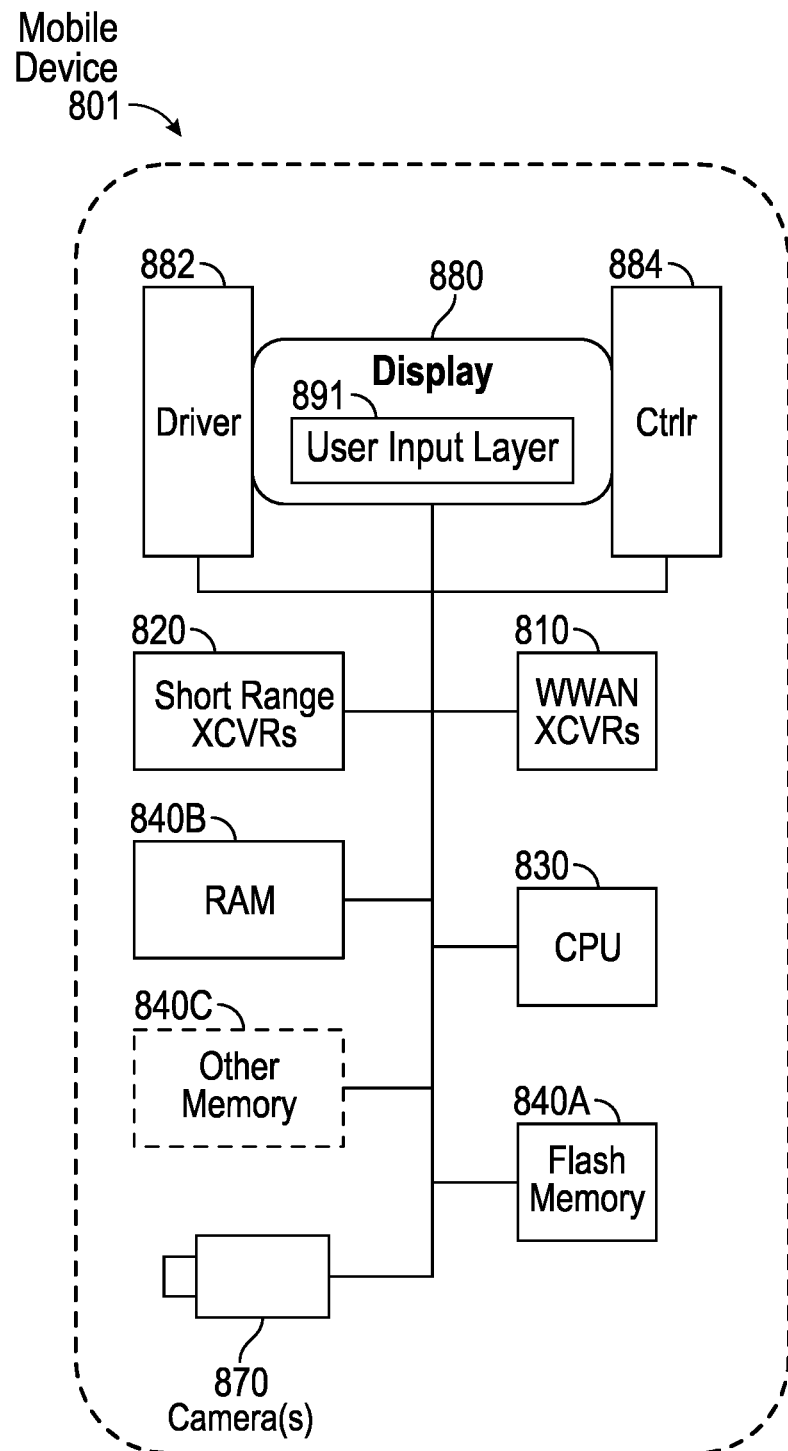
FIG. 8 illustrates a block diagram of an example hardware configuration for a mobile device of the system of FIG. 7.

FIG. 8 is a high-level functional block diagram of an example mobile device 701. Mobile device 701 includes a flash memory 840A which stores programming to be executed by the CPU 830 to perform all or a subset of the functions described herein.

The mobile device 701 may include a camera 870 that comprises at least two visible-light cameras (first and second visible-light cameras with overlapping fields of view) or at least one visible-light camera and a depth sensor with substantially overlapping fields of view. Flash memory 840A may further include multiple images or video, which are generated via the camera 870.

As shown, the mobile device 701 includes an image display 880, a mobile display driver 882 to control the image display 880, and a display controller 884. In the example of FIG. 8, the image display 880 includes a user input layer 891 (e.g., a touchscreen) that is layered on top of or otherwise integrated into the screen used by the image display 880.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 8 therefore provides a block diagram illustration of the example mobile device 701 with a user interface that includes a touchscreen input layer 891 for receiving input (by touch, multi-touch, or gesture, and the like, by hand, stylus or other tool) and an image display 880 for displaying content.

As shown in FIG. 8, the mobile device 701 includes at least one digital transceiver (XCVR) 810, shown as WWAN XCVRs, for digital wireless communications via a wide-area wireless mobile communication network. The mobile device 701 also includes additional digital or analog transceivers, such as short-range transceivers (XCVRs) 820 for short-range network communication, such as via NFC, VLC, DECT, ZigBee, Bluetooth™, or Wi-Fi. For example, short range XCVRs 820 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 701, the mobile device 701 can include a global positioning system (GPS) receiver. Alternatively, or additionally the mobile device 701 can utilize either or both the short range XCVRs 820 and WWAN XCVRs 810 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 810, 820.

The transceivers 810, 820 (i.e., the network communication interface) conforms to one or more of the various digital wireless communication standards utilized by modern mobile networks. Examples of WWAN transceivers 810 include (but are not limited to) transceivers configured to operate in accordance with Code Division Multiple Access (CDMA) and 3rd Generation Partnership Project (3GPP) network technologies including, for example and without limitation, including 3G, 4G LTE and 5G. For example, the transceivers 810, 820 provide two-way wireless communication of information including digitized audio signals, still image and video signals, web page information for display as well as web-related inputs, and various types of mobile message communications to/from the mobile device 701.

The mobile device 701 further includes a microprocessor that functions as a central processing unit (CPU); shown as CPU 830 in FIG. 8. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 830, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 830 or processor hardware in smartphone, laptop computer, and tablet.

The CPU 830 serves as a programmable host controller for the mobile device 701 by configuring the mobile device 701 to perform various operations, for example, in accordance with instructions or programming executable by CPU 830. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 701 includes a memory or storage system, for storing programming and data. In the example, the memory system may include a flash memory 840A, a random-access memory (RAM) 840B, and other memory components 840C, as needed. The RAM 840B serves as short-term storage for instructions and data being handled by the CPU 830, e.g., as a working data processing memory. The flash memory 840A typically provides longer-term storage.

Hence, in the example of mobile device 701, the flash memory 840A is used to store programming or instructions for execution by the CPU 830. Depending on the type of device, the mobile device 701 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

Figure 9:
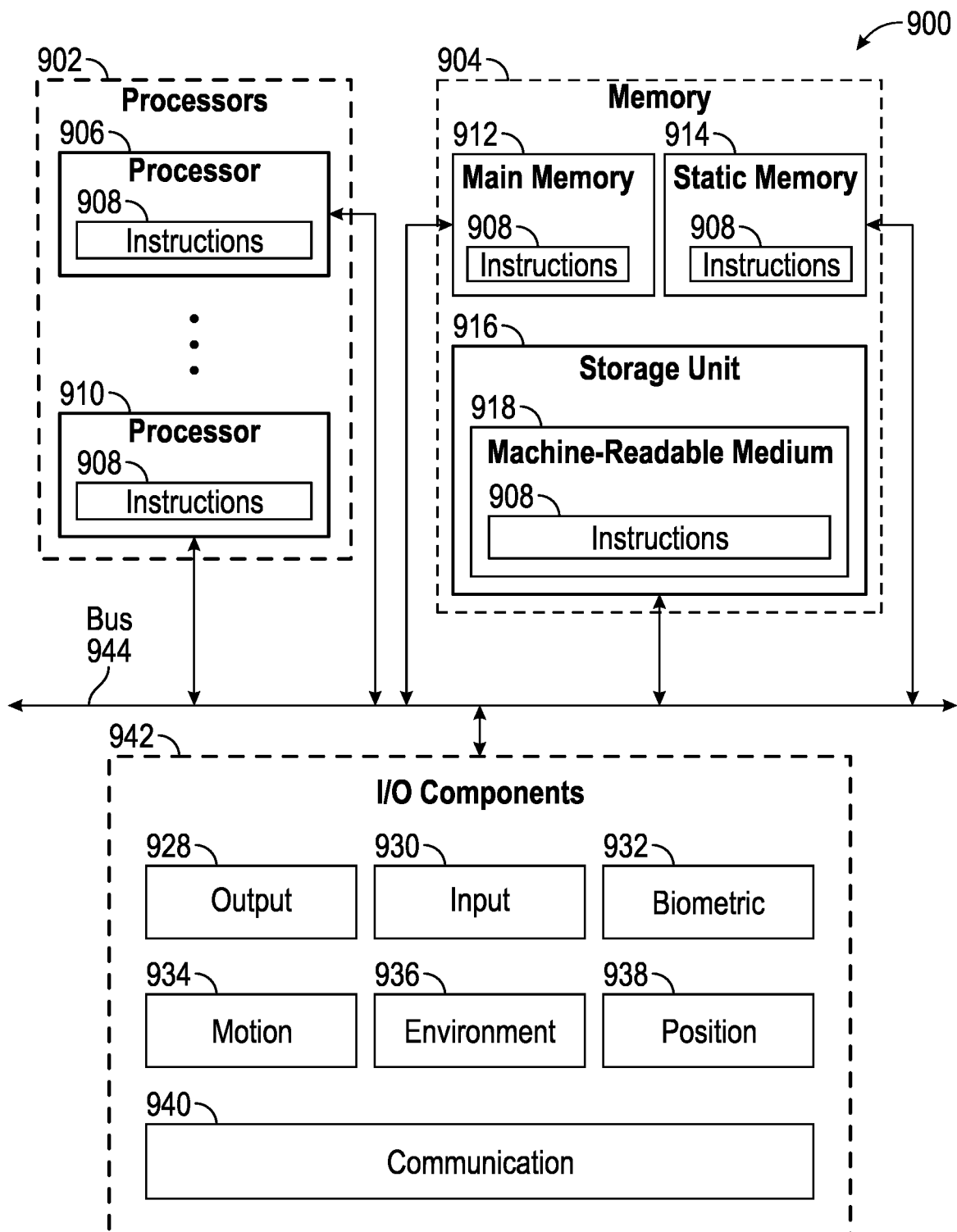
FIG. 9 illustrates a block diagram of an example machine in the form of a computer system within which a set of instructions may be executed for causing the machine to perform any one or more of the methodologies discussed herein.

FIG. 9 is a diagrammatic representation of a machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and I/O components 942, which may be configured to communicate with each other via a bus 944. In an example, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 (e.g., a non-transitory machine-readable storage medium) within the storage unit 916, within at least one of the processors 902 (e.g., within the processor's cache memory), or any suitable combination thereof, during execution thereof by the machine 900.

Furthermore, the machine-readable medium 918 is non-transitory (in other words, not having any transitory signals) in that it does not embody a propagating signal. However, labeling the machine-readable medium 918 "non-transitory" should not be construed to mean that the medium is incapable of movement; the medium should be considered as being transportable from one physical location to another. Additionally, since the machine-readable medium 918 is tangible, the medium may be a machine-readable device.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 9. In various examples, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location, force of touches or touch gestures, or other tactile input components), audio input components (e.g., a microphone), and the like.

In further examples, the I/O components 942 may include biometric components 932, motion components 934, environmental components 936, or position components 938, among a wide array of other components. For example, the biometric components 932 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 further include communication components 940 operable to couple the machine 900 to networks and client devices. For example, the communication components 940 may include a network interface component or another suitable device to interface with a network. In further examples, the communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, memory of the processors 902), storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 102, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via a coupling 926 (e.g., a peer-to-peer coupling) to devices.

Figure 10:
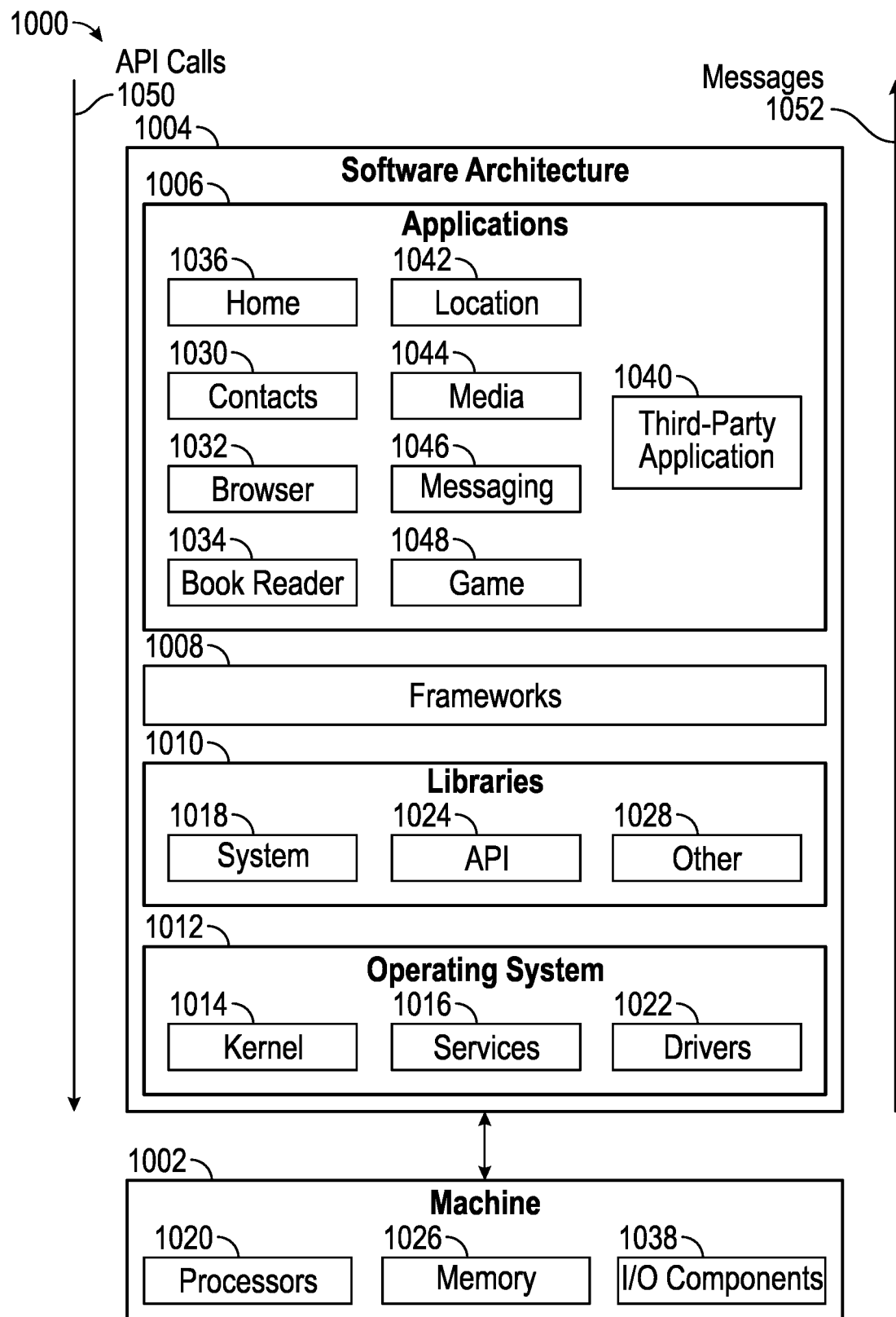
FIG. 10 illustrates a block diagram of an example software architecture within which the present disclosure may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionalities. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

The present disclosure encompasses all changes, substitutions, variations, alterations, and modifications to the examples herein that a person having ordinary skill in the art would comprehend. Similarly, where appropriate, the appended claims encompass all changes, substitutions, variations, alterations, and modifications to the examples herein that a person having ordinary skill in the art would comprehend.

What is claimed is:
1. An eyewear device comprising:
an inertial measurement unit (IMU) configured to capture IMU data;
a rolling shutter camera configured to capture image frames, each image frame comprising a plurality of image scan lines;
a first pipeline configured to process IMU data;
a second pipeline configured to process the IMU data and the image frames, the second pipeline comprising:
a selection module configured to select features within the image frames for tracking;
a feature tracking module configured to track the features from image frame to image frame;
a triangulation module configured to obtain three-dimensional (3D) locations corresponding to the features being tracked by computing spatial locations of the tracked features; and
an extended Kalman filter (EKF) module configured to calculate poses of the eyewear device using the 3D locations and the IMU data; and
a visual-inertial tracking system (VITS) core coupled to the first pipeline and the second pipeline, the VITS core configured to:
estimate a reference pose of the rolling shutter camera at a reference line, the reference line being one of the plurality of the image scan lines;
estimate relative poses of the rolling shutter camera to the reference pose of the rolling shutter camera using IMU data; and refine the reference pose of the rolling shutter camera based on the relative poses of the rolling shutter camera in combination with information contained in the image frames.

2. The eyewear device of claim 1, wherein the image frames are captured by the rolling shutter camera at a relatively low rate and the IMU data is captured by the IMU at a relatively high rate.

3. The eyewear device of claim 2, wherein the relatively low rate is 30 cycles per second and the relatively high rate is 800 cycles per second.

4. The eyewear device of claim 3, wherein the capture of image frames and the capture or IMU data are tightly coupled.

5. The eyewear device of claim 1, wherein the first pipeline comprises a strap down integration update module configured to process IMU data.

6. The eyewear device of claim 1, wherein the reference pose is estimated based on a refined reference pose of a previous image frame and the IMU data.

7. The eyewear device of claim 1, wherein the selected features comprise at least one corner and at least one edge.

8. The eyewear device of claim 1, wherein the IMU is next to the rolling shutter camera.

9. The eyewear device of claim 8, further comprising:
a front façade supporting the IMU and the rolling shutter camera; and
a pair of arms extending from the front façade.

10. A visual-inertial tracking method for use with an eyewear device, the method comprising:
capturing inertial measurement unit (IMU) data with an IMU;
capturing image frames with a rolling shutter camera, each image frame comprising a plurality of image scan lines;
processing IMU data in a first pipeline;
processing the IMU data and the image frames in a second pipeline, the second pipeline comprising a selection module configured to select features within the image frames for tracking, a feature tracking module configured to track the features from image frame to image frame, a triangulation module configured to obtain three-dimensional (3D) locations corresponding to the features being tracked by computing spatial locations of the tracked features, and an extended Kalman filter (EKF) module configured to calculate poses of the eyewear device using the 3D locations and the IMU data;
estimating a reference pose of the rolling shutter camera at a reference line using a visual-inertial tracking system (VITS) core coupled to the first pipeline and the second pipeline, the reference line being one of the plurality of the image scan lines;
estimating, by the VITS core, relative poses of the rolling shutter camera to the reference pose of the rolling shutter camera using IMU data; and
refining, by the VITS core, the reference pose of the rolling shutter camera based on the relative poses of the rolling shutter camera in combination with information contained in the image frames.

11. The method of claim 10, wherein the image frames are captured by the rolling shutter camera at a relatively low rate and the IMU data is captured by the IMU at a relatively high rate.

12. The method of claim 11, wherein the relatively low rate is 30 cycles per second and the relatively high rate is 800 cycles per second.

13. The method of claim 12, wherein the capture of image frames and the capture or IMU data are tightly coupled.

14. The method of claim 10, wherein the first pipeline comprises a strap down integration update module configured to process IMU data.

15. The method of claim 10, wherein the reference pose is estimated based on a refined reference pose of a previous image frame and the IMU data.

16. A non-transitory computer-readable medium with instructions stored thereon, wherein the medium is configured to be incorporated in an augmented reality system of an eyewear device configured to track poses of a rolling shutter camera, the instructions, when executed by a processor, configuring the eyewear device to perform steps comprising:
capturing inertial measurement unit (IMU) data with an IMU;
capturing image frames with the rolling shutter camera, each image frame comprising a plurality of image scan lines;
processing IMU data in a first pipeline;
processing the IMU data and the image frames in a second pipeline, the second pipeline comprising a selection module configured to select features within the image frames for tracking, a feature tracking module configured to track the features from image frame to image frame, a triangulation module configured to obtain three-dimensional (3D) locations corresponding to the features being tracked by computing spatial locations of the tracked features, and an extended Kalman filter (EKF) module configured to calculate poses of the eyewear device using the 3D locations and the IMU data;
estimating a reference pose of the rolling shutter camera at a reference line using a visual-inertial tracking system (VITS) core coupled to the first pipeline and the second pipeline, the reference line being one of the plurality of the image scan lines;
estimating, by the VITS core, relative poses of the rolling shutter camera to the reference pose of the rolling shutter camera using IMU data; and
refining, by the VITS core, the reference pose of the rolling shutter camera based on the relative poses of the rolling shutter camera in combination with information contained in the image frames.

17. The non-transitory computer-readable medium of claim 16, wherein the image frames are captured by the rolling shutter camera at a relatively low rate and the IMU data is captured by the IMU at a relatively high rate.

18. The non-transitory computer-readable medium of claim 17, wherein the relatively low rate is 30 cycles per second and the relatively high rate is 800 cycles per second.

19. The non-transitory computer-readable medium of claim 16, wherein the first pipeline comprises a strap down integration update module configured to process IMU data.

20. The non-transitory computer-readable medium of claim 16, wherein the reference pose is estimated based on a refined reference pose of a previous image frame and the IMU data.

* * * * *